Nov. 16, 1926.  
T. MIDGLEY  
1,606,886  
METHOD AND MACHINE FOR REMOVING TIRE CASINGS FROM MOLDS  
Original Filed Nov. 5, 1923    4 Sheets-Sheet 1

INVENTOR.
Thomas Midgley
BY
Edward C. Taylor
ATTORNEY.

Nov. 16, 1926.  
T. MIDGLEY  
1,606,886  
METHOD AND MACHINE FOR REMOVING TIRE CASINGS FROM MOLDS  
Original Filed Nov. 5, 1923    4 Sheets-Sheet 2
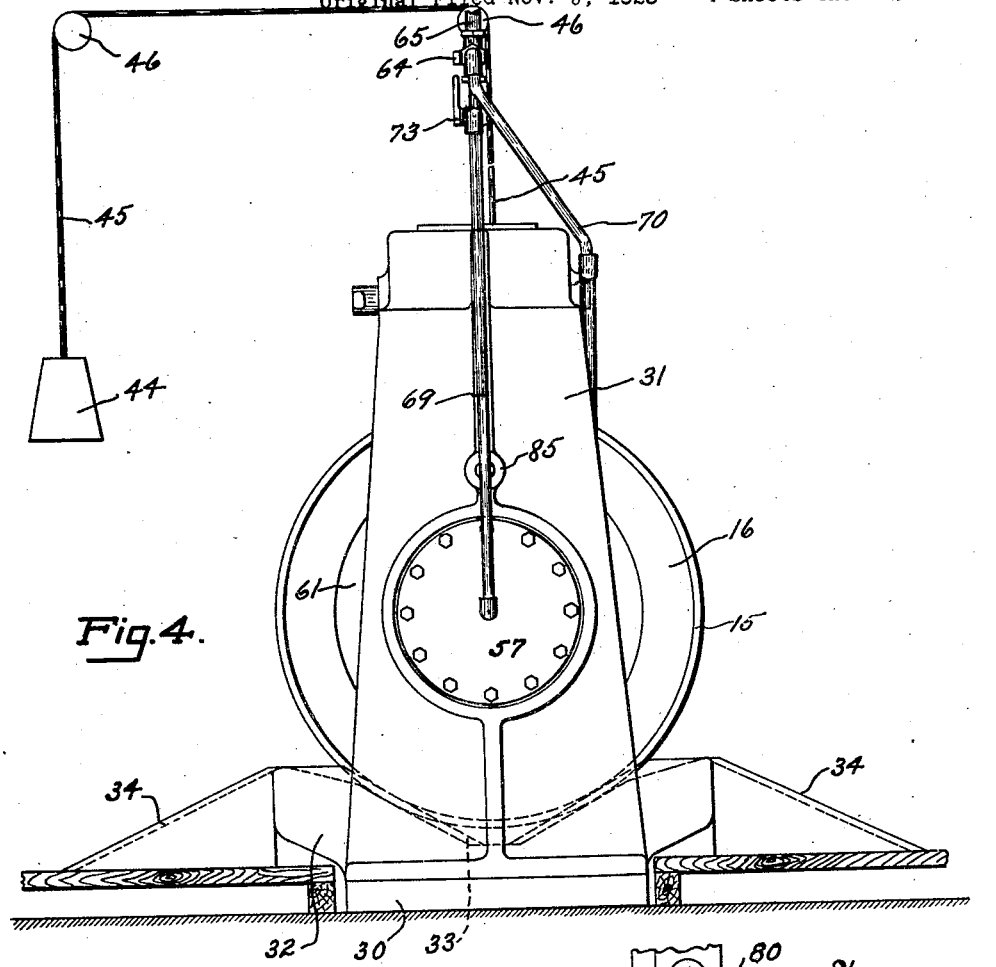
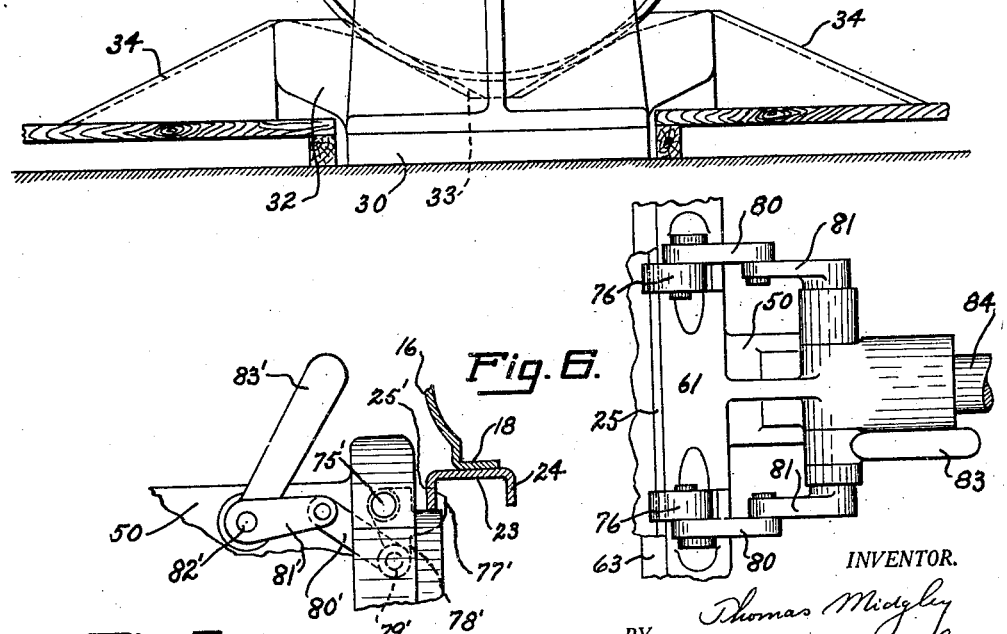
INVENTOR.  
Thomas Midgley  
BY Edward C. Taylor  
ATTORNEY.

Nov. 16, 1926. 1,606,886
T. MIDGLEY
METHOD AND MACHINE FOR REMOVING TIRE CASINGS FROM MOLDS
Original Filed Nov. 5, 1923 4 Sheets-Sheet 3

INVENTOR.
Thomas Midgley
BY
Edward C Taylor
ATTORNEY.

Nov. 16, 1926.

T. MIDGLEY 1,606,886

METHOD AND MACHINE FOR REMOVING TIRE CASINGS FROM MOLDS

Original Filed Nov. 5, 1923    4 Sheets-Sheet 4

INVENTOR.
Thomas Midgley
BY
Edward C. Taylor
ATTORNEY.

Patented Nov. 16, 1926.

1,606,886

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND MACHINE FOR REMOVING TIRE CASINGS FROM MOLDS.

Application filed November 5, 1923, Serial No. 672,770. Renewed May 21, 1926.

This invention relates to methods and machines for removing tire casings from the molds in which they have been vulcanized or for assembling, and will be described in an embodiment particularly designed for use with molds of the type shown in my copending application Serial No. 625,728, filed March 17, 1923.

By the use of this invention tires may be removed from the molds in which they were vulcanized without fatiguing manual labor, and more rapidly than would be possible with methods formerly in use. Furthermore, in the preferred embodiment of the machine the same mechanism serves to assemble the mold parts about the tire with great accuracy and speed. While the main objects of the invention are attained in the facility and accuracy with which the operations are performed, other objects will appear from the following specification and claims.

The invention will now be described with reference to the accompanying drawings, in which—

Fig. 4 is an end elevation of the machine;

Fig. 5 is a view, similar to Fig. 3, of the left hand holding unit, illustrating a modification;

Fig. 6 is a top plan view of the mechanism appearing in Fig. 3;

It will save repetition to consider first the mechanical construction of the preferred form of machine and then the method both in its essential features and as it is carried out by the machine. Stated in terms of its operating elements the machine comprises a holding device adapted to grip the tread ring of the mold, devices for taking hold of the side plates and pulling them away from the tire and tread ring, and one or more annular pressure members adapted to contact with the tire at the bead and force the tire through the tread ring. There are also provided moving and controlling devices for these several elements as will be described.

Figure 7:
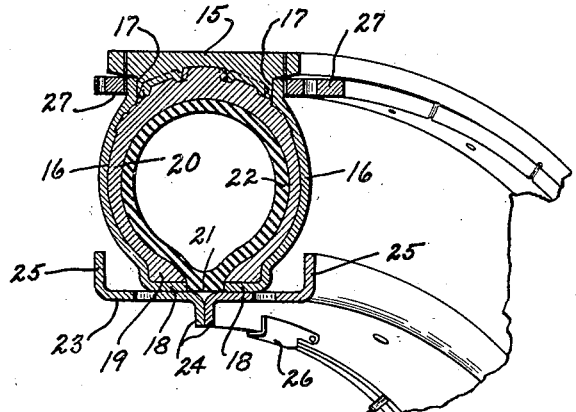
Fig. 7 is a sectional perspective view of a tire mold of the type described in my copending application Serial No. 625,728, and with which the embodiment of the machine shown is particularly designed to deal.

The machine to be described has its details arranged particularly for use with a mold of the type shown in Fig. 7 and described more fully in my copending application above referred to. This mold has a tread ring 15, of any desired construction, but which is handled by the machine and method under consideration as an integral annular member. Side plates 16 of thin material such as sheet steel have their outer peripheries shaped to abut against shoulders 17 on the tread ring, and their inner peripheries 18 turned so as to underlie the bead portions 19 of the tire casing 20, preferably terminating short of contact with each other so as to provide space for the base portion 21 of a vulcanizing fluid pressure bag 22. Secured to the inturned base edges 18 of the side plates as by spot welding are plates 23, having abutting flanges 24 and outer flanges 25. In all the figures except Fig. 5 this latter flange has been shown as extending outwardly. In Fig. 5 it has been reversed so that it extends in the same direction as flange 24. Either form may be used, the design of the machine being conformably changed.

During the handling of the mold between assembly and placing in the heater it is conveniently held assembled by clips 26 spanning the abutting flanges 24 and either pivoted to one of these flanges or completely detachable as may be desired. This particular form of mold is designed for use in a heater having a hydraulic ram for holding the molds closed against the heavy internal expansive pressure exerted through bags 22. The molds as stacked upon each other in such a heater rest upon flanges 25, these being spaced to keep the side plates of adjacent molds just out of contact. The outer edges of the side plates 16 are held pressed against the shoulders 17 by perforated rings 27 which are placed between the molds as they are stacked in the heater, possessing the double function of aligning the molds and transmitting the pressure of the hydraulic ram. Other features of this mold, not necessary for an understanding of the present invention, are described in my copending application Serial No. 625,728.

The machine designed for handling this type of mold may now be described. It is supported on a base 30, upon which is secured a frame 31 in the form of an inverted U. On the base is a block 32 having its center sloped downwards from both sides (Fig. 4), and a channel 33 formed in its surface of the width of the tread ring 15. Sloping sides 34 of the block assist in rolling the molds into and out of the cradle formed by the central cut away portion, the mold being held against lateral motion while in the cradle by the sides of channel 33.

Frame 31 carries the moving parts of the machine. These may be divided into two groups of mechanism, a clamping device for cooperating with the cradle to hold the tread ring firmly in place, and opposed pressing and pulling devices operable on the side plates. The clamping device comprises a sliding block 36 (Figs. 1 and 2) suitably mounted in bearing ways 37 on the U frame and provided with a channel 38 on its lower surface adapted to receive the tread ring 15. A shoulder 39 on the block cooperates with a cam 40 fast on a shaft 41 which can be rotated by means of a handle 42. In order to relieve the cam of the greater part of the weight of the block the latter is preferably provided with a counterbalance heavy enough to relieve the cam of undue strain but not heavy enough to prevent the block sinking of its own weight when the lifting pressure of the cam is withdrawn. The block is conveniently made with a detachable bottom facing 43, in which the channel 38 is located, serving both to facilitate assembly of the block 36 around shaft 41 and to permit of the substitution of other facings designed for molds of other size or shape. Counterbalancing is conveniently accomplished by a weight 44, connected to the top of block 36 by a rope or cable 45 passing over pulleys 46 secured to the machine frame or other support.

In the lowered position of the block cam 40 clears slightly (say by ¼ inch) a ledge 47 on the bottom piece 43. This permits a slight free vertical movement of the block during the separation of the mold side plates as will later be described.

The devices for applying or removing the mold side plates are carried upon yokes 50 attached to the ends of piston rods 51 running through suitable stuffing boxes 52 into pneumatic cylinders 53. The pistons carried by the rods may be of any desired construction, in the embodiment shown being each composed of three disks 54 located on a shouldered portion of the piston rods and clamped together by a nut 55, oppositely facing cup packings 56 being placed between each adjacent pair of plates. Suitable cylinder heads 57 are attached to the ends of the cylinder, one of them carrying the stuffing box 52 previously mentioned. The cylinders themselves are provided with flanges 58 through which they may be attached by bolts 59, to the U frame 31, the body of the cylinders passing through apertures 60 in the frame.

On each of the yokes 50 is a member 61, preferably in the form of a complete ring shouldered at 62 to bear against the inner edges of the mold side plates or against the tire bead itself in case the apparatus is being used for the removal of a tire from the encircling tread ring. The cylindrical portion 63 of the ring below shoulder 62 is useful chiefly in insuring accurate registry of the side plates when the mold is being assembled by use of the apparatus.

Besides its functions of assembling the molds and of forcing the tires out of their tread rings, this apparatus is adapted to take hold of the mold side plates and pull them away from the tire and tread ring. To accomplish these several purposes the pneumatic cylinders are made double acting. When air is admitted to their outer ends the pistons are forced inward, carrying the ring 61 of one or both heads forcibly towards the tire. This motion is useful in cases where the mold is being assembled or the tire pushed out. In the pulling of the side plates by the gripping mechanism about to be described this action is reversed, and air is admitted to the inner ends of the cylinders, causing the yokes 50 with their associated parts to be drawn away from each other. Control of the cylinders is secured through a four way valve 64, operable to admit compressed air from a supply pipe 65 to either pipe 66 or pipe 67. The former of these has branches 68 and 69 leading to the outer ends of the air cylinders, while the latter has branches 70 and 71 leading to the inner ends of the cylinders. The valve also connects with an exhaust pipe 72, and operates to vent to this pipe the ends of the cylinders not connected with the compressed air. A shut off valve 73 is inserted in pipe 69, so that when the apparatus is being used for pushing a tire out of its tread ring only one of the cylinders will operate.

Figure 3:
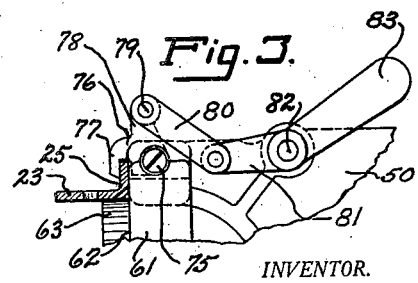
Fig. 3 is an enlarged detail, partly in section, of mechanism appearing in Fig. 1, but in a different operative position.

Located for convenience at the top of each of the yokes are a pair of pivot shafts 75 upon which are mounted rocking dogs 76 of generally bell-crank form. One arm of this bell crank is hooked at 77 so as to overhang the flange 25 carried by the side plates. The other arm 78 is pivoted at 79 to a link 80 pivoted to a crank 81 on the shaft 82 of a handle lever 83. By rocking the handle the dogs can be caused either to engage or release the side plate flanges (compare Figs. 1 and 3). To use this part of the machine the rings 61 are pressed against the side plates (the dogs being meanwhile raised as in Fig. 1) by admitting air to the outer ends of the cylinders. Handles 83 are then rocked to cause engagement of the dogs with the side plates (Fig. 3) and air admitted to the inner ends of the cylinders to cause yokes 61 to separate and the side plates to be pulled away from the tire. Hooks 77 and the cylindrical portion 63 of the rings 61 serve to confine the flanges 25 in a sort of pocket, so that the side plates are firmly grasped and yet a pivotal movement (compare Figs. 9 and 10) is permitted which accommodates the movement of the side plates as described below. Straight line movement of the yokes without rotation on their axes is insured by rods 84 secured to the yokes and sliding in bearings 85 on the U frame.

In Fig. 5 the arrangement of the locking dogs is modified so as to operate with a mold having the flanges 25 of the side plates turned in instead of out. The parts being similar except for the obvious reversal, they are designated by primed numerals corresponding to the numerals applied to the parts in the preferred form.

Figures 8, 9:
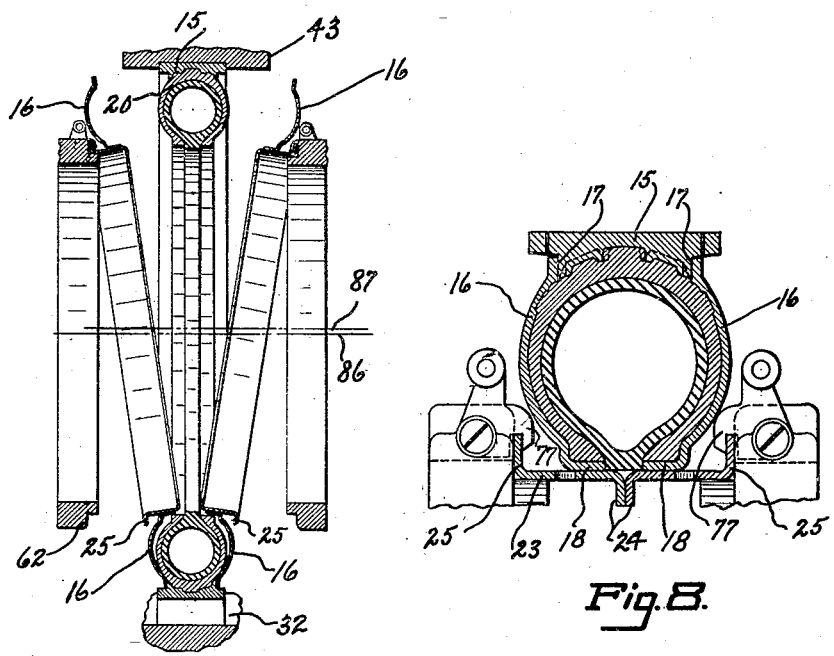
Fig. 8 is a sectional detail of the mold at the start of the operation of removing it from the vulcanized tire.
Fig. 9 is a section showing the side plates of the mold in process of being removed from the tire and tread ring.

The first step in the removal of the molds from the vulcanized tire according to my improved method (after of course releasing clips 26 or whatever other means may be employed for holding the molds temporarily assembled) is the pulling of the side plates away from the tire. I have found that the best results will be attained with a minimum of force if the pulling force be exerted only locally on the two side plates at points opposite each other, and the separation thereby started and continued until the side plates are quite pulled away from the tire. An intermediate stage of the step is shown in Fig. 9, which clearly shows the effect of the step disclosed in peeling the side plates from the tire. In the machine shown this operation is performed by first causing the yokes 50 to approach the side plates under the influence of the air cylinders, then engaging the hooks 77 with the flanges 25, and then reversing the air supply to the air cylinders to cause the yokes to be pulled apart forcibly.

Figure 1:
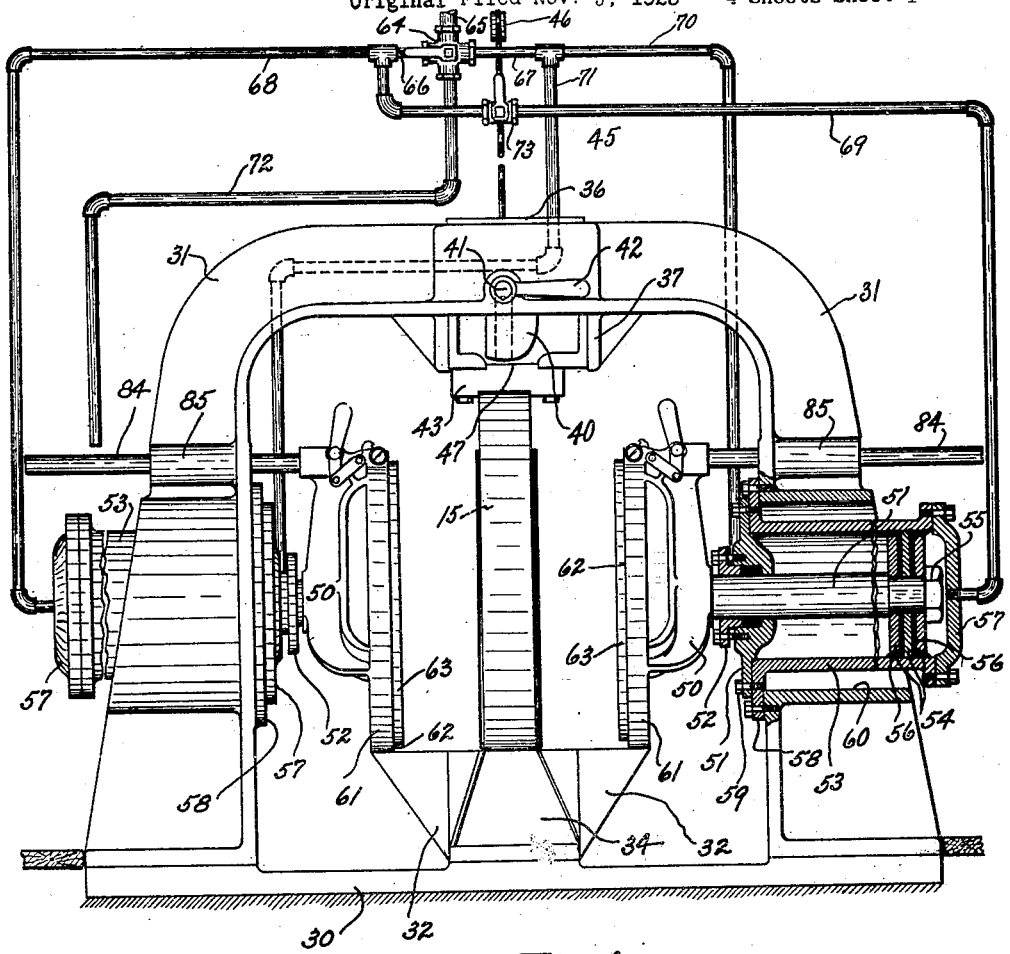
Fig. 1 is a side elevation of one form of machine embodying the invention, partly broken away to show the internal construction.
Figure 2:
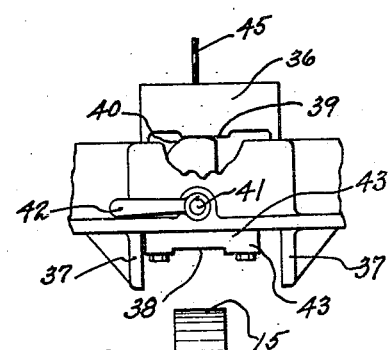
Fig. 2 is a detail of mechanism appearing in Fig. 1 but in a different operative position.
Figure 10:
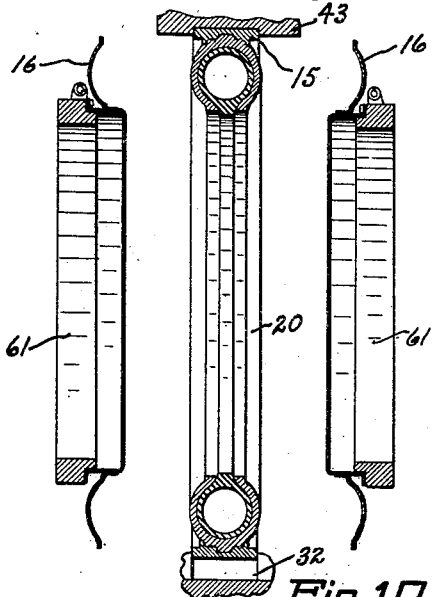
Fig. 10 is a similar view showing the completion of this operation.

Due to the tilted position assumed by the side plates during their removal, and the fact that the portions of the plates held by hooks 77 and ring 61 move in straight horizontal lines, the lower parts of the side plates are raised slightly as long as they remain in contact with the tire. While this contact continues the tire and side plates, together with the tread ring, will be slightly raised, resuming their normal position when the contact is released by the complete breaking away of the side plates. This effect is shown in Fig. 9 by the space between the center lines 86 and 87, the former being the normal center line of the tire and mold and the latter that of the raised position temporarily assumed during the removal of the side plates. It is to allow for this action that in the machine described the clamping block 36 is permitted a slight vertical motion as previously described; the channel 33 in base block 32 being sufficiently deep to prevent the lower part of the tread ring becoming displaced, yet leaving clearance between the side plates and channel, which permits assembling and stripping of side plates. After the side plates have been pulled to the position of Fig. 9 a slight additional separation will cause their lower parts to be pulled clear from the tire and tread ring, this action being aided by the arresting of any further upward motion of the clamping block 36 and tire by contact of ledge 47 with cam 40 (Fig. 1). The position of the side plates in the machine after they are completely pulled away from the tire is indicated in Fig. 10. They may now be removed from the machine and the tire stripped from the tread ring.

Figure 11:
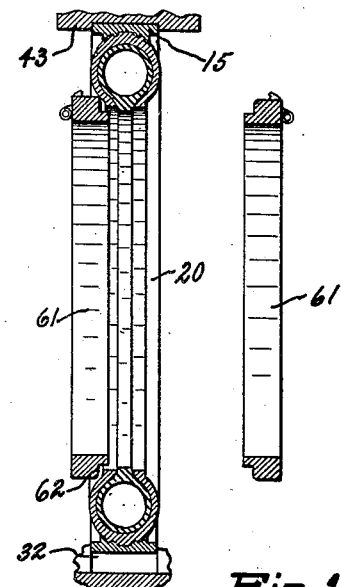
Fig. 11 is a similar view showing the initiation of the removal of the tire from the tread ring.
Figure 12:
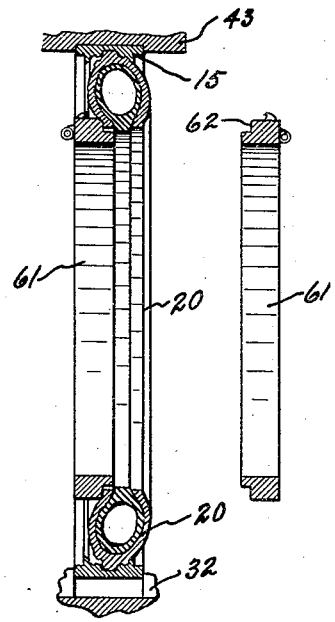
Fig. 12 is a similar view showing an intermediate stage of this operation.
Figure 13:
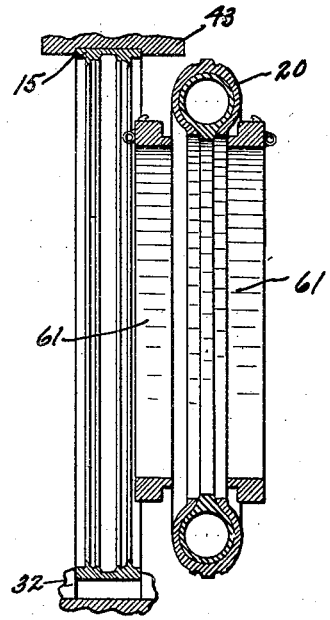
Fig. 13 is a similar view showing the operation completed.

The tread ring in the type of mold under consideration spans the tread portion of the tire, being transversely arched to conform to the latter's curved surface and moreover having molding recesses provided to form the desired tread design. I have found that by exerting pressure against the tire bead in the direction of the tire's axis, preferably simultaneously throughout the circumference, the tire will distort and roll out of the tread ring. This effect is illustrated in Figs. 11 to 13. In Fig. 11 the application of pressure is begun, this being accomplished in the use of the described machine by operating one of the air cylinders so as to bring the shoulder 62 of ring 61 against the tire bead. On the continuation of this pressure the tire will roll, somewhat as indicated in Fig. 12, the tread being progressively disengaged from the tread ring, and finally snapping free as indicated by Fig. 13. This completes the stripping operation and the tread ring may be withdrawn from the machine by throwing handle 42.

In assembling the tire and mold by means of the machine the raw tire is first placed in the tread ring, an operation comparatively easy since the tire is always built smaller than its finished size. If the tire will not slip into place by simple manual pressure it can easily be driven home by a few strokes of a mallet. The tire and tread ring are then placed in the machine and clamped in place as when stripping. The side plates are then placed on rings 61 in the position of Fig. 10, except that the clamping dogs need not be in their operative position. The plates will rest on the cylindrical portions 63 of the rings and be carried thereby. The rings are next advanced against the tire by means of the air cylinders, this serving to centralize the tire within the tread ring and to bring the side plates against the shoulders 17 of the tread ring and against each other at flanges 24. Clips 26 are now put in place, the rings 61 backed off, and the mold is ready to be placed in the vulcanizing press.

An alternative procedure, which has some advantages in aligning the valve stem in the fluid pressure bag, upon which the tire is vulcanized, with the notches (not shown) provided for its reception in the flanges 24, is as follows. Instead of allowing the side plates to hang freely on the rings 61 as in Fig. 10 they are placed with their lower edges resting on the tread ring substantially as in Fig. 9, and their upper portions resting against the end of cylindrical ring portions 63. In this position if the valve stem be located roughly at the bottom of the tire, it is an easy task to place the notches in the side plates in alignment with it. On the rings being pressed together the cylindrical portions will enter the central apertures of the side plates and the process thenceforwards proceeds as in the earlier given example.

It is also possible to remove vulcanized tires from molds, and to insert a fresh tire in the mold without removing the mold parts from the machine. In the embodiment of the machine shown it is necessary to remove one side plate from its supporting ring 61 after stripping the plates from the tire to permit the ring being used for stripping the tire from the tread ring. After this has been accomplished and the ring 61 moved back to its outer position a fresh tire can be inserted in the tread ring and the mold re-assembled as above described.

Having thus described my invention, I claim:

1. A method of removing a molded tire casing from a unitary annular tread molding ring which comprises forcing the tire casing laterally out of the tread ring by axial pressure applied adjacent the bead portions of the casing.

2. A method of removing a molded tire casing from a three part mold, comprising removing the side plates by pulling them from the tire at substantiallly one point of their circumference, and separating the tire and the tread ring by pressure applied simultaneously throughout a circumference.

3. A method of removing a molded tire casing from a unitary annular tread ring comprising distorting the tire progressively so as to draw successive circumferential zones of the tire out of engagement with the tread ring.

4. A machine adapted for removing tire casings from annular tread rings comprising a device for holding the tread ring, a member for engaging the casing around its inner circumference, and mechanism adapted to cause relative movement of said device and member to remove the tire casing laterally from the tread ring.

5. A machine adapted for removing tires from molds having a tread ring and separable side plates, comprising means for pulling the side plates away from the tire, and means for removing the tire from the tread ring.

6. A machine adapted for removing tires from molds having a unitary annular tread ring and separable side plates, comprising means for pulling the side plates away from the tire, and means for engaging the bead portions of the tire and pushing the tire through the tread ring.

7. A machine adapted for removing tire casings from molds having a unitary annular tread ring and separable side plates, comprising holding means for the tread ring, a pair of devices movable toward and from the sides of the tire and mold and adapted to grasp the side plates and pull them away from the tire, and a member movable through the tread ring and adapted to engage the bead portions of the tire and push the tire through the tread ring.

8. A machine adapted for handling mold parts and tire casings comprising holding devices for the center section of the mold, members movable toward and away from the sides of the mold, and devices carried by said members for carrying the side portions of the mold.

9. A machine adapted for handling tire casings and vulcanizing molds comprising holding devices for the center section of a mold, ring members arranged on either side of the mold, fluid pressure devices operable to move the ring members toward or away from the tire, and devices carried by said member for engaging the side portions of the mold.

10. A machine adapted for handling tire casings and vulcanizing molds comprising holding devices for the center section of a mold, ring members arranged on either side of the mold, and fluid pressure devices operable to move the ring members toward or away from the tire, said members having cylindrical portions adapted to enter into and support the side portions of the mold.

11. A machine adapted for handling tire casings and vulcanizing molds comprising holding devices for the center section of a mold, ring members arranged on either side of the mold, fluid pressure devices operable to move the ring members toward or away from the tire, said members having cylindrical portions adapted to enter into and support the side portions of the mold, and rocking clamps adapted to overlie flanges on the side portions of the mold and hold it securely between said clamps and the cylindrical portions.

THOMAS MIDGLEY.